United States Patent
Laaker et al.

(10) Patent No.: US 11,504,905 B2
(45) Date of Patent: *Nov. 22, 2022

(54) METHODS OF REDUCING DISTORTION OF ADDITIVELY MANUFACTURED OBJECTS

(71) Applicant: Carbon, Inc., Redwood City, CA (US)

(72) Inventors: Kyle Laaker, Redwood City, CA (US); Leah Marie Heist, San Mateo, CA (US); Bob E. Feller, San Mateo, CA (US)

(73) Assignee: Carbon, Inc., Redwood City, CA (US)

(*) Notice: Subject to any disclaimer, the term of this patent is extended or adjusted under 35 U.S.C. 154(b) by 114 days.

This patent is subject to a terminal disclaimer.

(21) Appl. No.: 16/970,455

(22) PCT Filed: Feb. 21, 2019

(86) PCT No.: PCT/US2019/018929
§ 371 (c)(1),
(2) Date: Aug. 17, 2020

(87) PCT Pub. No.: WO2019/165052
PCT Pub. Date: Aug. 29, 2019

(65) Prior Publication Data
US 2021/0114287 A1    Apr. 22, 2021

Related U.S. Application Data

(60) Provisional application No. 62/633,197, filed on Feb. 21, 2018.

(51) Int. Cl.
*B29C 64/129*     (2017.01)
*B29C 64/264*     (2017.01)
(Continued)

(52) U.S. Cl.
CPC .......... *B29C 64/129* (2017.08); *B29C 64/182* (2017.08); *B29C 64/188* (2017.08);
(Continued)

(58) Field of Classification Search
CPC ... B29C 64/129; B29C 64/182; B29C 64/188; B29C 64/264; B29C 64/35; B33Y 10/00
See application file for complete search history.

(56) References Cited

U.S. PATENT DOCUMENTS 4,785,075 A     11/1988  Shimp
5,059,359 A  *  10/1991  Hull ...................... B29C 64/135
                                                    118/620

(Continued)

FOREIGN PATENT DOCUMENTS

WO      0172501 A1      10/2001
WO      2002/30655       4/2002
(Continued)

OTHER PUBLICATIONS

International Search Report and Written Opinion for PCT/US2019/018929 dated May 23, 2019, 12 pages.

(Continued)

*Primary Examiner* — Michael M. Robinson
(74) *Attorney, Agent, or Firm* — Myers Bigel, P.A.

(57) ABSTRACT

A method of making a three-dimensional object (11) from a light polymerizable dual cure resin (16), includes the steps of: (a) producing a green intermediate object by light polymerization of the resin in a stereolithography process (e.g., continuous liquid interface production); (i) the object comprising a body portion and a circumferential boundary portion (12) included in at least part of the body portion i (ii) the stereolithography process including overexposing the boundary portion (as compared to the exposure of the body portion) with light; (b) cleaning the intermediate object; and
(Continued)

then (c) baking the object to produce the three-dimensional object.

17 Claims, 5 Drawing Sheets

(51) Int. Cl.
  *B29C 64/188* (2017.01)
  *B29C 64/182* (2017.01)
  *B29C 64/35* (2017.01)
  *B33Y 10/00* (2015.01)
(52) U.S. Cl.
  CPC .......... *B29C 64/264* (2017.08); *B29C 64/35* (2017.08); *B33Y 10/00* (2014.12)

(56) References Cited

U.S. PATENT DOCUMENTS

| | | | |
|---|---|---|---|
| 5,122,441 A | 6/1992 | Lawton et al. |
| 5,196,137 A | 3/1993 | Merchant |
| 5,236,637 A | 8/1993 | Hull |
| 5,391,072 A | 2/1995 | Lawton et al. |
| 5,506,007 A | 4/1996 | Williams et al. |
| 5,529,473 A | 6/1996 | Lawton et al. |
| 5,773,403 A | 6/1998 | Hijino et al. |
| 5,824,259 A | 10/1998 | Allanic et al. |
| 5,824,634 A | 10/1998 | Merchant |
| 6,008,179 A | 12/1999 | Flynn et al. |
| 6,063,206 A | 5/2000 | Latta |
| 6,288,018 B1 | 9/2001 | Flynn et al. |
| 6,426,327 B1 | 7/2002 | Flynn et al. |
| 6,646,020 B2 | 11/2003 | Nyberg et al. |
| 6,689,734 B2 | 2/2004 | Doyel et al. |
| 6,699,829 B2 | 3/2004 | Doyel et al. |
| 6,753,304 B1 | 6/2004 | Barthelemy et al. |
| 7,183,248 B2 | 2/2007 | Manning |
| 7,328,077 B2 | 2/2008 | Durbin et al. |
| 7,438,846 B2 | 10/2008 | John |
| 7,481,647 B2 | 1/2009 | Sambu et al. |
| 7,709,544 B2 | 5/2010 | Doyle et al. |
| 7,845,930 B2 | 12/2010 | Shkolnik et al. |
| 7,892,474 B2 | 2/2011 | Shkolnik et al. |
| 7,897,558 B1 | 3/2011 | Arafat |
| 8,110,135 B2 | 2/2012 | El-Siblani |
| 8,738,340 B2 | 5/2014 | Dunne et al. |
| 8,765,108 B2 | 7/2014 | Lalleman |
| 9,023,782 B2 | 5/2015 | Peitersen et al. |
| 9,068,152 B2 | 6/2015 | Klinkhammer et al. |
| 9,095,787 B2 | 8/2015 | Panandiker et al. |
| 9,120,997 B2 | 9/2015 | Sadlowski et al. |
| 9,121,000 B2 | 9/2015 | Burkinshaw et al. |
| 9,175,248 B2 | 11/2015 | Klinkhammer et al. |
| 9,198,847 B2 | 12/2015 | Peffly et al. |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,360,757 B2 | 6/2016 | Desimone et al. |
| 9,375,298 B2 | 6/2016 | Boronkay et al. |
| 9,453,142 B2 | 9/2016 | Rolland et al. |
| 9,498,920 B2 | 11/2016 | Desimone et al. |
| 9,598,606 B2 | 3/2017 | Rolland et al. |
| 9,676,963 B2 | 6/2017 | Rolland et al. |
| 9,993,974 B2 | 6/2018 | Desimone et al. |
| 10,016,938 B2 | 7/2018 | Desimone et al. |
| 10,093,064 B2 | 10/2018 | Desimone et al. |
| 10,144,181 B2 | 12/2018 | Desimone et al. |
| 10,150,253 B2 | 12/2018 | Desimone et al. |
| 10,596,755 B2 | 3/2020 | Desimone et al. |
| 10,618,215 B2 | 4/2020 | Desimone et al. |
| 2003/0198824 A1* | 10/2003 | Fong ............... G03F 7/0037 524/731 |
| 2009/0130449 A1 | 5/2009 | El-Siblani |
| 2010/0249979 A1 | 9/2010 | John et al. |
| 2011/0089610 A1 | 4/2011 | El-Siblani et al. |
| 2013/0292862 A1 | 11/2013 | Joyce |
| 2013/0295212 A1 | 11/2013 | Chen et al. |
| 2015/0331402 A1 | 11/2015 | Lin et al. |
| 2015/0360419 A1 | 12/2015 | Willis et al. |
| 2016/0303793 A1 | 10/2016 | Ermoshkin et al. |
| 2017/0102670 A1 | 4/2017 | Greene et al. |
| 2017/0129167 A1 | 5/2017 | Castanon |
| 2017/0129169 A1 | 5/2017 | Batchelder et al. |
| 2018/0126630 A1 | 5/2018 | Panzer et al. |
| 2018/0243976 A1 | 8/2018 | Feller |
| 2018/0290374 A1 | 10/2018 | Willis et al. |
| 2019/0126547 A1 | 5/2019 | Desimone et al. |
| 2019/0389127 A1 | 12/2019 | Desimone et al. |
| 2020/0139617 A1 | 5/2020 | Desimone et al. |

FOREIGN PATENT DOCUMENTS

| | | |
|---|---|---|
| WO | 2011086450 A2 | 7/2011 |
| WO | 2015164234 A1 | 10/2015 |
| WO | 2016133759 A1 | 8/2016 |
| WO | 2016145182 A1 | 9/2016 |
| WO | 2019165070 A1 | 8/2019 |

OTHER PUBLICATIONS

Second Written Opinion for PCT/US2019/018929 dated Apr. 2, 2020, 6 pages.
Dendukuri, Dhananjay, et al., "Continuous-flow lithography for high-throughput microparticle synthesis", Nature Materials, 5, 2006, 365-369.
Dendukuri, Dhananjay, et al., "Stop-flow lithography in a microfluidic device", The Royal Society of Chemistry, Lab on a Chip, 7, 2007, 818-828.
Dendurkuri, et al., ", Modeling of Oxygen-Inhibited Free Radical Photopolymerization in PDMS Microfluidic Device, Macromolecules, 2008, 41 (22), 8547-8556, published Oct. 21, 2008".
Janusziewicz, Rima, et al., "Layerless fabrication with continuous liquid interface production", PNAS, 113, 2016, 11703-11708.
Morelli, Dean, "Protest to Canadian Patent Applications by Joseph DeSimone et al", Regarding Continuous Liquid Interphase Printing. Canadian patent applications CA2898098A1, CA 2898103A1, and CA2898106A1. Dec. 31, 2015. Canadian Intellectual Property Office, 37 pp.
Pan, Y, et al., "A Fast Mask Projection Stereolithography Process for Fabricating Digital Models in Minutes", J. Manufacturing Sci. and Eng. 134, Oct. 2012, 051011-1.
Poelma, Justin, et al., "Rethinking digital manufacturing with polymers", Science, 358(6369), 2017, 1384-1385.
Stern, S. A., "The 'Barrer' Permeability Unit", Journal of Polymer Science: Part A-2, 6(11), 1968, 1933-1934.
Tumbleston, John R., et al., "Continuous liquid interface production of 3D Objects", Science, 347(6228), 2015, 1349-1352.
Yasuda, H., et al., "Permeability of Polymer Membranes to Dissolved Oxygen", Journal of Polymer Science, 4, 1966, 1314-1316.

* cited by examiner

METHODS OF REDUCING DISTORTION OF ADDITIVELY MANUFACTURED OBJECTS

RELATED APPLICATIONS

This application is a 35 U.S.C. § 371 national phase entry of International Application No. PCT/US2019/018929, filed Feb. 21, 2019, which claims the benefit of U.S. Provisional Patent Application Ser. No. 62/633,197, filed Feb. 21, 2018, the disclosure of each of which is incorporated by reference herein in its entirety.

FIELD OF THE INVENTION

The present invention concerns methods of additive manufacturing, and particularly concerns methods of additive manufacturing by stereolithography with dual cure resins in which distortion of parts, and dimensional variability of groups or batches of parts, is reduced.

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and 9,216,546 to DeSimone et al.; and also J. Tumbleston, D. Shirvanyants, N. Ermoshkin et al., Continuous liquid interface production of 3D Objects, *Science* 347, 1349-1352 (published online 16 Mar. 2015); see also Rolland et al., U.S. Pat. Nos. 9,676,963, 9,453,142 and 9,598,606).

When dual cure resins are employed, the sequence of production is typically: (i) produce a "green" intermediate part (or batch of parts) by additive manufacturing; (ii) clean the parts, and then (iii) further cure the parts, usually by heating and/or microwave irradiating (baking). The further curing step can sometimes cause part distortion (e.g., warping and/or shrinking. Accordingly, there is a need for new techniques to reduce distortion during additive manufacturing with dual cure resins.

SUMMARY OF THE INVENTION

A first aspect of the invention is a method of making a three-dimensional object from a light polymerizable dual cure resin, comprising the steps of:
  (a) producing a green intermediate object by light polymerization of the resin in a stereolithography process (e.g., continuous liquid interface production);
    (i) the object comprising a body portion and a circumferential boundary portion included in at least part of the body portion;
    (ii) the stereolithography process including overexposing the boundary portion (as compared to the exposure of the body portion) with light;
  (b) cleaning the intermediate object; and then
  (c) baking the object to produce the three-dimensional object.

In some embodiments, the boundary portion is configured to reduce distortion (e.g., shrinking and/or warping) of the object during the baking step.

In some embodiments, the circumferential boundary portion is interrupted (e.g., perforated); in other embodiments, the circumferential boundary portion is uninterrupted.

In some embodiments, the circumferential boundary comprises a surface edge portion; in other embodiments, circumferential boundary portion comprises an internal boundary portion; and in still other embodiments, the circumferential boundary portion comprises a combination of at least one surface edge portion and at least one internal boundary portion.

In some embodiments, the circumferential boundary portion is feathered (or tapered) in the Z dimension.

In some embodiments: (i) that portion of the object that includes the boundary portion has an average thickness of from 0.4 or 0.5 millimeters to 5 or 10 millimeters; and/or (ii) the boundary portion has an average thickness of from 10 or 50 micrometers to 100 or 200 micrometers.

In some embodiments, the cleaning step is carried out by wiping (including blowing), washing, or a combination thereof.

A second aspect of the invention is a method of making a plurality of dimensionally uniform three-dimensional objects from a light polymerizable dual cure resin, the method comprising the steps of:
  (a) producing green intermediate objects by light polymerization of the resin in a stereolithography process (e.g., continuous liquid interface production);
    (i) each intermediate object comprising a body portion and a circumferential boundary portion included in at least part of the body portion;
    (ii) the stereolithography process including overexposing the boundary portion (as compared to the exposure of the body portion) with light;
  (b) cleaning the intermediate objects; and then
  (c) baking the intermediate objects to produce the three-dimensional objects; the circumferential boundary portion configured to enhance dimensional uniformity of the three-dimensional objects by reducing distortion (e.g., shrinkage and/or warpage) of each object during the baking step.

In some embodiments, the cleaning step is carried out by wiping (including blowing), washing, or a combination thereof.

In some embodiments, the circumferential boundary portion is interrupted (e.g., perforated); in other embodiments, the circumferential boundary portion is uninterrupted.

In some embodiments, the circumferential boundary comprises a surface edge portion; in other embodiments, circumferential boundary portion comprises an internal boundary portion; and in still other embodiments, the circumferential boundary portion comprises a combination of at least one surface edge portion and at least one internal boundary portion.

In some embodiments, the circumferential boundary portion is feathered (or tapered) in the Z dimension.

In some embodiments: (i) that portion of the object that includes the boundary portion has an average thickness of from 0.4 or 0.5 millimeters to 5 or 10 millimeters; and/or (ii) the boundary portion has an average thickness of from 10 or 50 micrometers to 100 or 200 micrometers.

In some embodiments, the objects are produced simultaneously as a batch thereof on the same carrier platform.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

Figure 1:
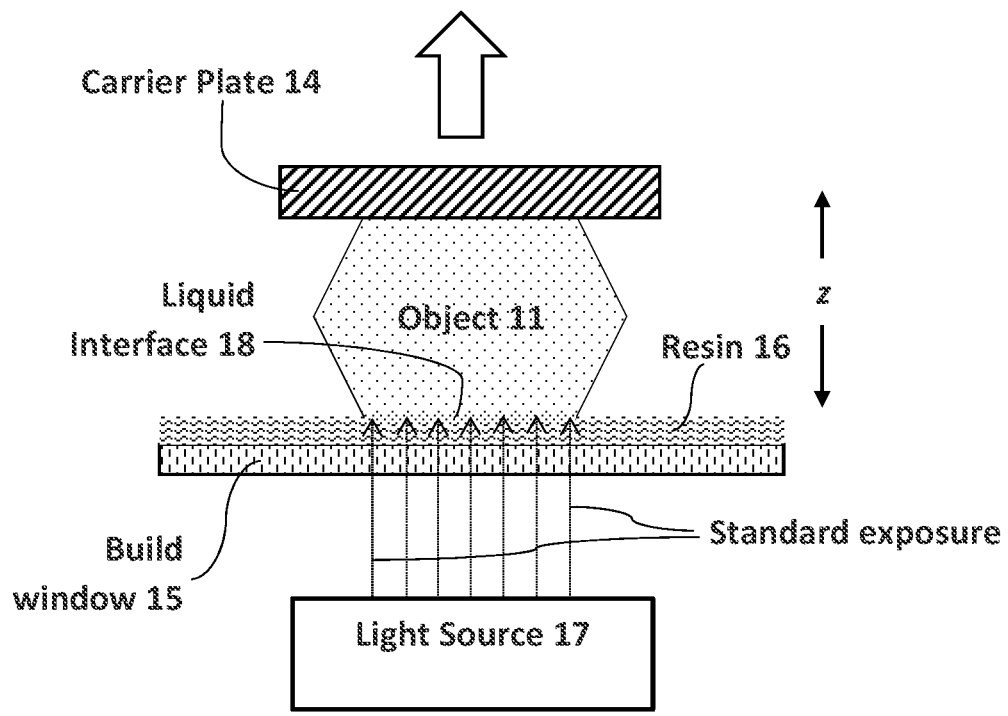
FIG. 1 is a side schematic view of an object being produced in accordance with the prior art.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Production by Additive Manufacturing

Dual cure resins for additive manufacturing are known and described in, for example, Rolland et al., U.S. Pat. Nos. 9,676,963; 9,598,606; and 9,453,142, the disclosures of which are incorporated herein by reference. Suitable examples include, but are not limited to, resins for producing parts comprised of polymers such as: polyurethane, polyurea, and copolymers thereof; epoxy; cyanate ester, silicone, etc.

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the intermediate object is formed by continuous liquid interface production (CLIP). CLIP is known and described in, for example, PCT Application Nos. PCT/US2014/015486 (U.S. Pat. No. 9,211,678); PCT/US2014/015506 (U.S. Pat. No. 9,205,601), PCT/US2014/015497 (U.S. Pat. No. 9,216,546), and in J. Tumbleston, D. Shirvanyants, N. Ermoshkin et al., Continuous liquid interface production of 3D Objects, *Science* 347, 1349-1352 (2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially-cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016). Other examples of methods and apparatus for carrying out particular embodiments of CLIP, or of additive manufacturing, include but are not limited to those described in B. Feller, US Patent App. Pub. No. US 2018/0243976 (published Aug. 30, 2018); M. Panzer and J. Tumbleston, US Patent App Pub. No. US 2018/0126630 (published May 10, 2018); K. Willis and B. Adzima, US Patent App Pub. No. US 2018/0290374 (Oct. 11, 2018).

After the intermediate three-dimensional object is formed, it is typically cleaned, and then further cured, preferably by baking (although further curing may in some embodiments be concurrent with the first cure, or may be by different mechanisms such as contacting to water, as described in U.S. Pat. No. 9,453,142 to Rolland et al.).

2. Cleaning/Washing

Objects as described above can be cleaned in any suitable manner, such as by wiping (with a rigid or flexible wiper, fabric, or compressed gas such as compressed air), washing, or combinations thereof.

Wash liquids that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

In some preferred embodiments, where the residual resin has a boiling point of at least 90 or 100° C. (e.g., up to 250 or 300° C., or more), the wash liquid has a boiling point of at least 30° C., but not more than 80 or 90° C. Boiling points are given herein for a pressure of 1 bar or 1 atmosphere.

Examples of organic solvents that may be used as a wash liquid, or as a constituent of a wash liquid, include, but are not limited to, alcohol, ester, dibasic ester, ketone, acid, aromatic, hydrocarbon, ether, dipolar aprotic, halogenated, and base organic solvents, including combinations thereof. Solvents may be selected based, in part, on their environmental and health impact (see, e.g., GSK Solvent Selection Guide 2009).

Examples of alcohol organic solvents that may be used in the present invention include, but are not limited to, aliphatic and aromatic alcohols such as 2-ethyl hexanol, glycerol, cyclohexanol, ethylene glycol, propylene glycol, di-propylene glycol, 1,4-butanediol, isoamyl alcohol, 1,2-propanediol, 1,3-propanediol, benzyl alcohol, 2-pentanol, 1-butanol, 2-butanol, methanol, ethanol, t-butanol, 2-propanol, 1-propanol, 2-methoxyethanol, tetrahydrofuryl alcohol, benzyl alcohol, etc., including combinations thereof. In some embodiments, a C1-C6 or C1-C4 aliphatic alcohol is preferred.

Examples of ester organic solvents that may be used to carry out the present invention include, but are not limited to, t-butyl acetate, n-octyl acetate, butyl acetate, ethylene carbonate, propylene carbonate, butylenes carbonate, glycerol carbonate, isopropyl acetate, ethyl lactate, propyl acetate, dimethyl carbonate, methyl lactate, ethyl acetate, ethyl propionate, methyl acetate, ethyl formate etc., including combinations thereof.

Examples of dibasic ester organic solvents include, but are not limited to, dimethyl esters of succinic acid, glutaric acid, adipic acid, etc., including combinations thereof.

Examples of ketone organic solvents that may be used to carry out the present invention include, but are not limited to, cyclohexanone, cyclopentanone, 2-pentanone, 3-pentanone, methylisobutyl ketone, acetone, methylethyl ketone, etc., including combinations thereof.

Examples of acid organic solvents that may be used to carry out the present invention include, but are not limited to, propionic acid, acetic anhydride, acetic acid, etc., including combinations thereof.

Examples of aromatic organic solvents that may be used to carry out the present invention include, but are not limited to, mesitylene, cumene, p-xylene, toluene, benzene, etc., including combinations thereof.

Examples of hydrocarbon (i.e., aliphatic) organic solvents that may be used to carry out the present invention include, but are not limited to, cis-decalin, ISOPAR™ G, isooctane, methyl cyclohexane, cyclohexane, heptane, pentane, methylcyclopentane, 2-methylpentane, hexane, petroleum spirit, etc., including combinations thereof.

Examples of ether organic solvents that may be used to carry out the present invention include, but are not limited to, di(ethylene glycol), ethoxybenzene, tri(ethylene glycol), sulfolane, DEG monobutyl ether, anisole, diphenyl ether, dibutyl ether, t-amyl methyl ether, t-butylmethyl ether, cyclopentyl methyl ether, t-butyl ethyl ether, 2-methyltetrahydrofuran, diethyl ether, bis(2-methoxyethyl) ether, dimethyl ether, 1,4-dioxane, tetrahydrofuran, 1,2-dimethoxyethane, diisopropyl ether, etc., including combinations thereof.

Examples of dipolar aprotic organic solvents that may be used to carry out the present invention include, but are not limited to, dimethylpropylene urea, dimethyl sulphoxide, formamide, dimethyl formamide, N-methylformamide, N-methyl pyrrolidone, propanenitrile, dimethyl acetamide, acetonitrile, etc., including combinations thereof.

Examples of halogenated organic solvents that may be used to carry out the present invention include, but are not limited to, 1,2-dichlorobenzene, 1,2,4-trichlorobenzene, chlorobenzene, trichloroacetonitrile, chloroacetic acid, trichloroacetic acid, perfluorotoluene, perfluorocyclohexane, carbon tetrachloride, dichloromethane, perfluorohexane, fluorobenzene, chloroform, perfluorocyclic ether, trifluoroacetic acid, trifluorotoluene, 1,2-dichloroethane, 2,2,2-trifluoroethanol, etc., including combinations thereof.

Examples of base organic solvents that may be used to carry out the present invention include, but are not limited to, N,N-dimethylaniline, triethylamine, pyridine, etc., including combinations thereof.

Examples of other organic solvents that may be used to carry out the present invention include, but are not limited to, nitromethane, carbon disulfide, etc., including combinations thereof.

Examples of surfactants include, but are not limited to, anionic surfactants (e.g., sulfates, sulfonates, carboxylates, and phosphate esters), cationic surfactants, zwitterionic surfactants, nonionic surfactants, etc., including combinations thereof. Common examples include, but are not limited to, sodium stearate, linear alkylbenzenesulfonates, lignin sulfonates, fatty alcohol ethoxylates, alkylphenol ethoxylates, etc., including combinations thereof. Numerous examples additional examples of suitable surfactants are known, some of which are described in U.S. Pat. Nos. 9,198,847, 9,175,248, 9,121,000, 9,120,997, 9,095,787, 9,068,152, 9,023,782, and 8,765,108.

Examples of chelants (chelating agents) include, but are not limited to, ethylenediamine tetraacetic acid, phosphates, nitrilotriacetic acid (NTA), citrates, silicates, and polymers of acrylic and maleic acid.

Examples of enzymes that may be included in the wash liquid include, but are not limited to, proteases, amylases, lipases, cellulases, etc., including mixtures thereof. See, e.g., U.S. Pat. Nos. 7,183,248, 6,063,206, In some embodiments, the wash liquid can be an aqueous solution of ethoxylated alcohol, sodium citrate, tetrasodium N,N-bis(carboxymethyl)-L-glutamate, sodium carbonate, citric acid, and isothiazolinone mixture. One particular example thereof is SIMPLE GREEN® all purpose cleaner (Sunshine Makers Inc., Huntington Beach, Calif., USA), used per se or mixed with additional water.

In some embodiments, the wash liquid can be an aqueous solution comprised of 2-butoxyethanol, sodium metasilicate, and sodium hydroxide. One particular example thereof is PURPLE POWER™ degreaser/cleaner (Aiken Chemical Co., Greenville, S.C., USA), used per se or mixed with additional water.

In some embodiments, the wash liquid can be ethyl lactate, alone or with a co-solvent. One particular example thereof is BIO-SOLV™ solvent replacement (Bio Brands LLC, Cinnaminson, N.J., USA), used per se or mixed with water.

In some embodiments, the wash liquid consists of a 50:50 (volume:volume) solution of water and an alcohol organic solvent such as isopropanol (2-propanol).

Examples of hydrofluorocarbon solvents that may be used to carry out the present invention include, but are not limited to, 1,1,1,2,3,4,4,5,5,5-decafluoropentane (Vertrel® XF, DuPont™ Chemours), 1,1,1,3,3-Pentafluoropropane, 1,1,1, 3,3-Pentafluorobutane, etc.

Examples of hydrochlorofluorocarbon solvents that may be used to carry out the present invention include, but are not limited to, 3,3-Dichloro-1,1,1,2,2-pentafluoropropane, 1,3-Dichloro-1,1,2,2,3-pentafluoropropane, 1,1-Dichloro-1-fluoroethane, etc., including mixtures thereof.

Examples of hydrofluoroether solvents that may be used to carry out the present invention include, but are not limited to, methyl nonafluorobutyl ether (HFE-7100), methyl nonafluoroisobutyl ether (HFE-7100), ethyl nonafluorobutyl ether (HFE-7200), ethyl nonafluoroisobutyl ether (HFE-7200), 1,1,2,2-tetrafluoroethyl-2,2,2-trifluoroethyl ether, etc., including mixtures thereof. Commercially available examples of this solvent include Novec 7100 (3M), Novec 7200 (3M).

Examples of volatile methylsiloxane solvents that may be used to carry out the present invention include, but are not limited to, hexamethyldisiloxane (OS-10, Dow Corning), octamethyltrisiloxane (OS-20, Dow Corning), decamethyltetrasiloxane (OS-30, Dow Corning), etc., including mixtures thereof.

Other siloxane solvents (e.g., NAVSOLVE™ solvent) that may be used to carry out the present invention include but are not limited to those set forth in U.S. Pat. No. 7,897,558.

In some embodiments, the wash liquid comprises an azeotropic mixture comprising, consisting of, or consisting essentially of a first organic solvent (e.g., a hydrofluorocarbon solvent, a hydrochlorofluorocarbon solvent, a hydrofluoroether solvent, a methylsiloxane solvent, or a combination thereof; e.g., in an amount of from 80 or 85 to 99 percent by weight) and a second organic solvent (e.g., a C1-C4 or C6 alcohol such as methanol, ethanol, isopropanol, tert-butanol, etc.; e.g., in an amount of from 1 to 15 or 20 percent by weight). Additional ingredients such as surfactants or chelants may optionally be included. In some embodiments, the azeotropic wash liquid may provide superior cleaning properties, and/or enhanced recyclability, of the wash liquid. Additional examples of suitable azeotropic wash liquids include, but are not limited to, those set forth in U.S. Pat. Nos. 6,008,179; 6,426,327; 6,753,304; 6,288, 018; 6,646,020; 6,699,829; 5,824,634; 5,196,137; 6,689,734; and 5,773,403, the disclosures of which are incorporated by reference herein in their entirety.

When the wash liquid includes ingredients that are not desired for carrying into the further curing step, in some embodiments the initial wash with the wash liquid can be followed with a further rinsing step with a rinse liquid, such as water (e.g., distilled and/or deionized water), or a mixture of water and an alcohol such as isopropanol.

3. Further Curing/Baking

After cleaning, the object is typically further cured, preferably by heating or baking. Heating may be active heating (e.g., in an oven, such as an electric, gas, solar oven or microwave oven, heated bath, or combination thereof), or passive heating (e.g., at ambient (room) temperature). Active heating will generally be more rapid than passive heating and in some embodiments is preferred, but passive heating—such as simply maintaining the intermediate at ambient temperature for a sufficient time to effect further cure—is in some embodiments preferred.

In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature). In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075).

In some embodiments, the heating step is carried out in an inert gas atmosphere. Inert atmosphere ovens are known, and generally employ an atmosphere enriched in nitrogen, argon, or carbon dioxide in the oven chamber. Suitable examples include but are not limited to those available from Grieve Corporation, 500 Hart Road Round Lake, Ill. 60073-2898 USA, Davron Technologies, 4563 Pinnacle Lane, Chattanooga, Tenn. 37415 USA, Despatch Thermal Processing Technology, 8860 207th Street, Minneapolis, Minn. 55044 USA, and others.

In other embodiments, the heating step is carried out in an inert liquid bath. Suitable inert liquids may be aqueous liquids (i.e., pure water, salt solutions, etc.), organic liquids (e.g., mineral oil, fluorinated, perfluorinated, and polysiloxane organic compounds such as perfluorohexane, perfluoro(2-butyl-tetrahydrofurane), perfluorotripentylamine, etc. (commercially available as PERFLUORINERT® inert liquids from 3M Company), and mixtures thereof. These inert liquids can be deoxygenated if necessary, such as by bubbling an inert gas such as nitrogen through the liquid, by boiling the inert liquid, by mixing oxygen-scavenging agents with the inert liquid medium (or contacting them to one another), etc., including combinations thereof (see, e.g., U.S. Pat. No. 5,506,007).

In some embodiments, the further curing or heating step (whether carried out in a liquid or gas fluid) is carried out at an elevated pressure (e.g., elevated sufficiently to reduce volatilization or out-gassing of residual monomers, prepolymers, chain extenders, and/or reactive diluents, etc.). Suitable pressure ranges are from 10 or 15 psi to 70 or 100 psi, or more.

4. Methods Including Overexposure of Edge Portions.

Figure 1A:
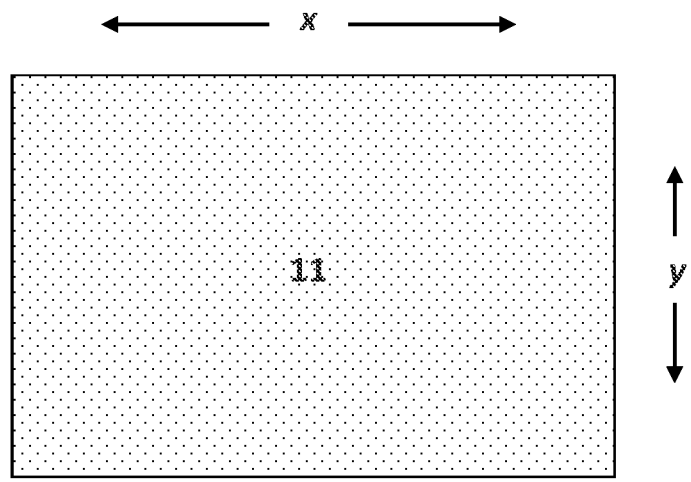
FIG. 1A is a top sectional view of an object produced as described in FIG. 1.

FIGS. 1-1A schematically illustrate a conventional approach for producing an object by bottom-up stereolithography, in which an object 11 is built between a carrier plate 14 and an optically transparent (to relevant wavelengths) window 15. A polymerizable liquid or resin 16 is placed on the window, through which patterned light is sequentially projected from a light source 17 to produce over time the object 11. In the various implementations of continuous liquid interface production (CLIP), a sustained liquid interface 18 is found between the object 11 and the resin 16 during production of some or all of the object 11. The sustained liquid interface may be created by any suitable technique, including but not limited to by the creation of a dead zone of unpolymerizable resin adjacent a window that is permeable to an inhibitor of polymerization (e.g., oxygen).

Figure 2:
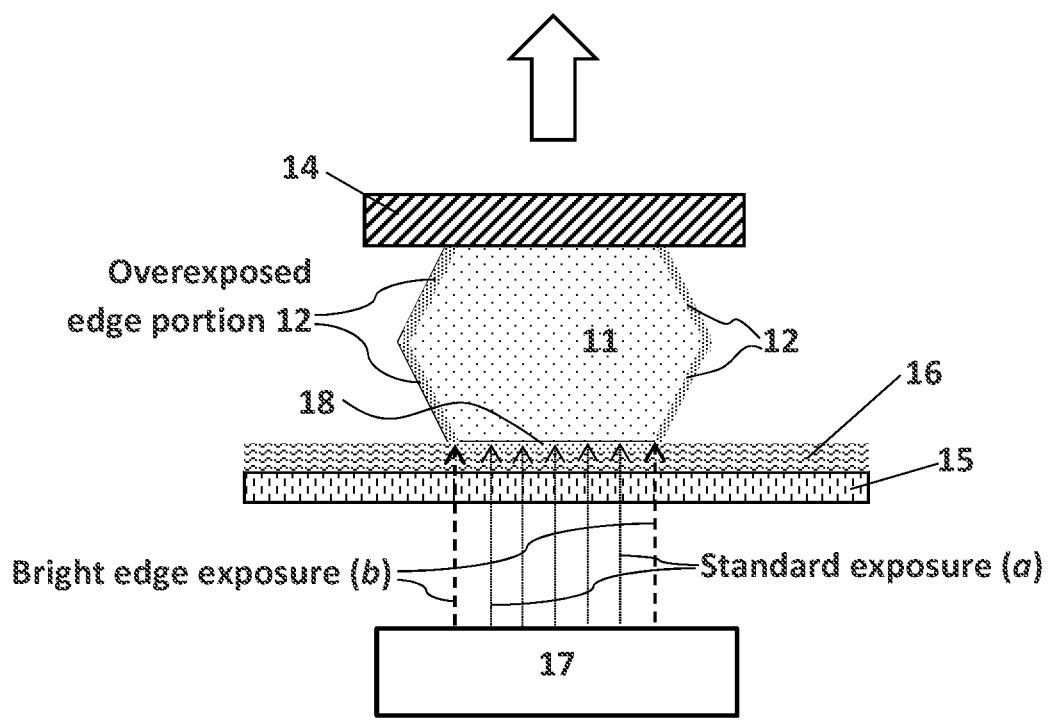
FIG. 2 is a side schematic view of an object being produced in accordance with the present invention.
Figure 2A:
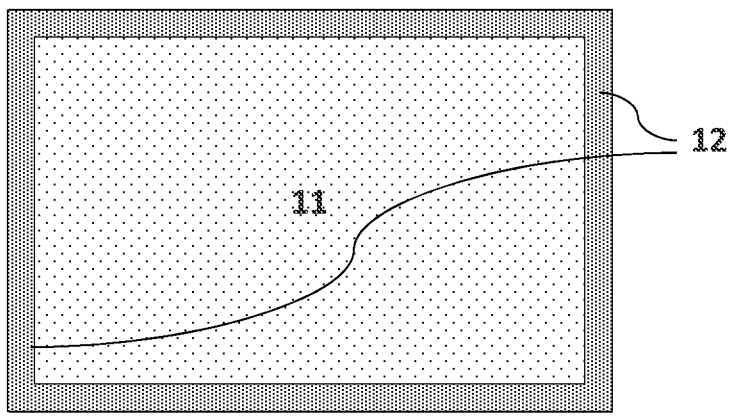
FIG. 2A is a top sectional view of an object produced as described in FIG. 2 with an overexposed circumferential boundary or edge portion.

FIG. 2-2A schematically illustrate an approach for producing an object in accordance with the present invention, in which a circumferential boundary or edge portion 12 of the object is overexposed by light during production (that is, exposed to light at an intensity greater than that necessary to solidify or photopolymerize the resin).

In alternate embodiments of the foregoing carried out by "top down" stereolithography, the carrier platform sinks down into a pool of polymerizable resin, and the sequential images are projected onto the top of the growing object from a light source positioned above that pool.

Selection of an edge portion or a circumferential boundary portion may be carried out in accordance with known techniques. Edge detection is a well known operation in image processing, particularly for black and white images analogous to the sequential projections employed in stereolithography. It can be done a number of ways, but the most common way is by either "dilating" the image and subtracting the original or by eroding the image and subtracting this "eroded" image from the original. Once the edge has been found, the overexposure can be carried out in any manner, such as by dimming all of the other pixels and exposing the entire slice for a longer duration of time.

For example, where a portion of an image is represented as:

0 0 1 1 1 0 0 where 0 is black (no exposure) and 1 is white (standard exposure) for each adjacent pixel, the eroded image thereof is:

0 0 0 1 0 0 0

So if one wanted the edge portion to be two times brighter, one could dim the pixels still present in the eroded image by 0.5:

0 0 1 0.5 1 0 0 but expose that slice twice as long. This is readily expanded into 2 and 3 dimensions in accordance with known techniques.

Figure 3A:
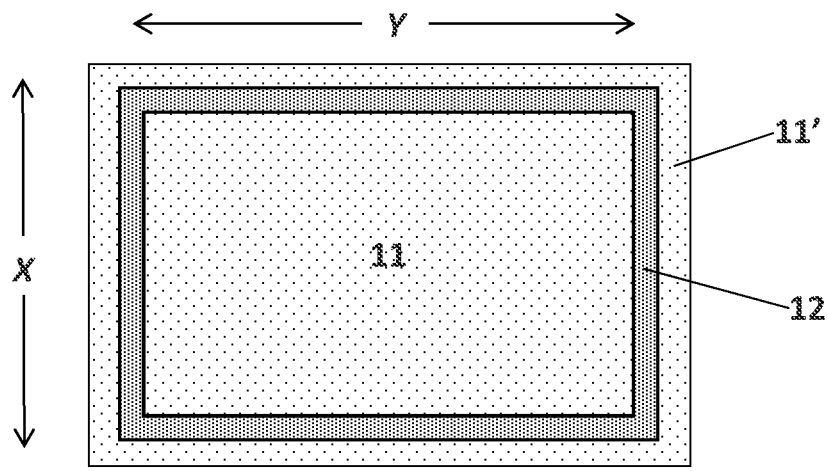
FIG. 3A is a top sectional view of an object similar to that of FIG. 2A, except that the circumferential boundary portion is internal within the object.
Figure 3B:
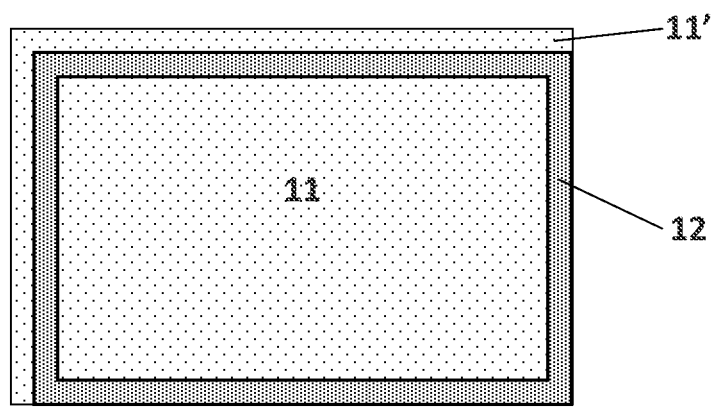
FIG. 3B is a top sectional view similar to FIG. 3A, except that the circumferential boundary portion is both external or surface in part, and internal in part.
Figure 3C:
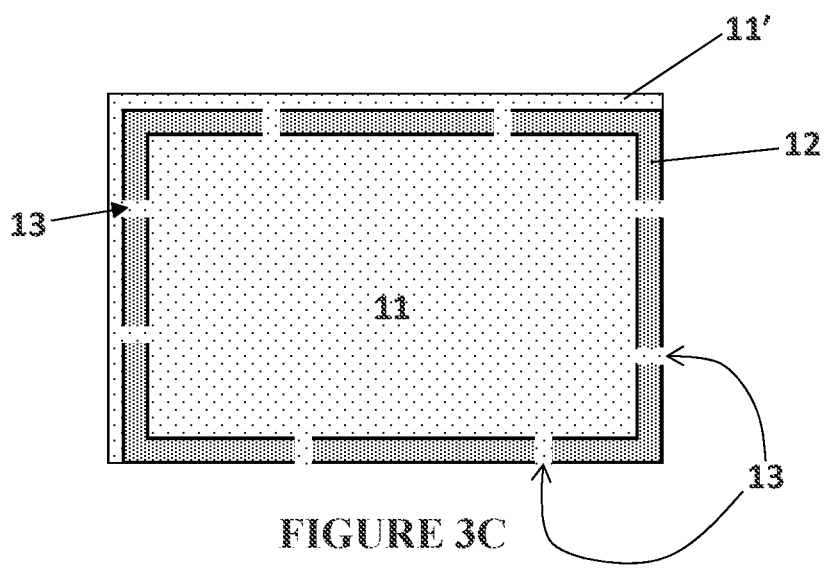
FIG. 3C is a top sectional view of an object similar to FIG. 3B, except that the circumferential boundary portion has interruptions or perforations included therein.

FIG. 3A shows an object similar to that of FIG. 2A, except that the circumferential border or boundary portion 12 is internalized just under an external surface edge portion 11', as may be desired to keep a surface finish more constant, and/or enhance accuracy, depending upon the intended use and/or particular geometry of the object. FIG. 3B shows an object similar to FIGS. 2A and 3A, except that the circumferential border or boundary portion includes both an external edge or surface portion 11' and an internal boundary portion 12. FIG. 3C shows an object similar to FIG. 3B, except that now perforations or gaps 13 are included in the boundary portion 12. Gaps of various sizes and shapes may be included, so long as the boundary portion is still configured to reduce distortion of the object during subsequent curing steps.

Figure 4:
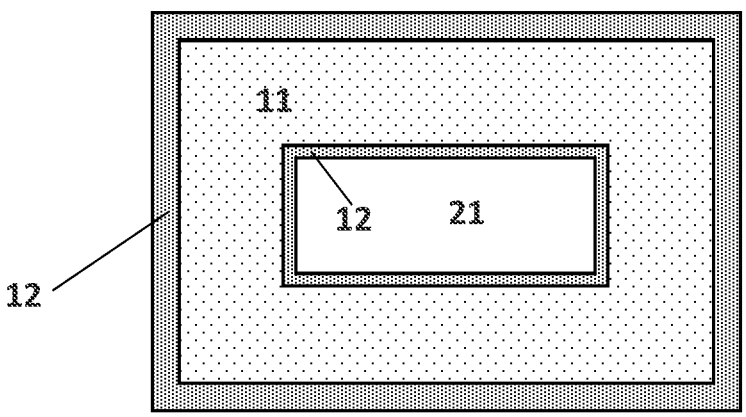
FIG. 4 is a top sectional view of an object similar to FIG. 2A, except that the object includes an internal cavity, and a circumferential boundary is included on the inside surface thereof as well as the outside surface thereof.
Figure 5:
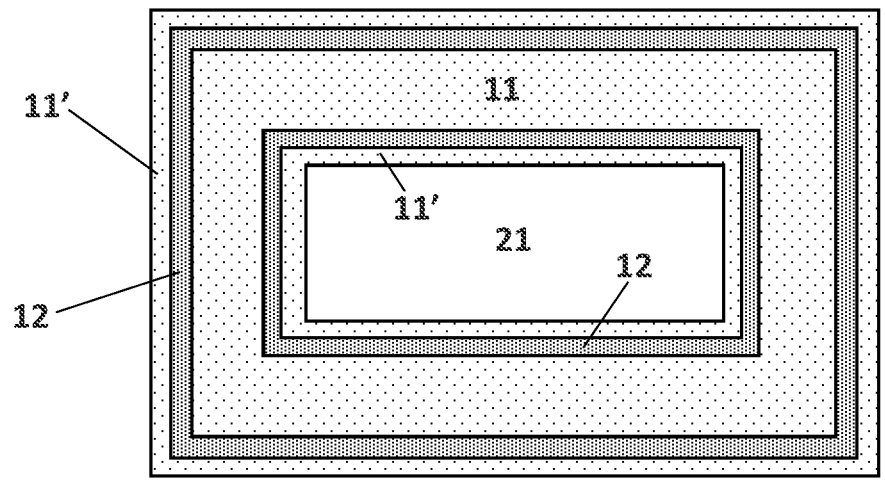
FIG. 5 is a top sectional view of an object similar to FIG. 4, except that the circumferential boundaries are now internal within the object, adjacent both the internal and external surfaces thereof.

FIGS. 4-5 are similar to FIGS. 2A-3C above, except that the object includes an internal cavity 21, and the overexposed edge portion or boundary portion are included adjacent the external cavity.

Figure 6A:
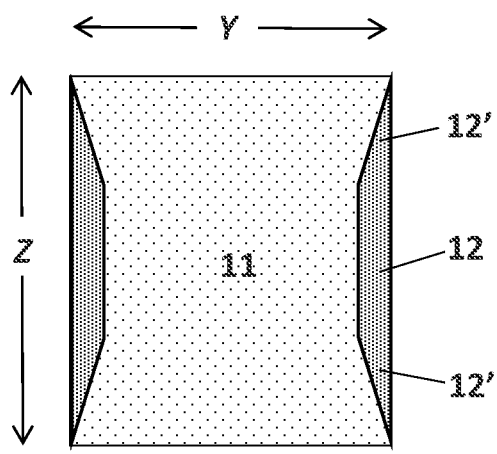
FIG. 6A is a side sectional view of an object similar to that shown being produced in FIG. 2, except that the peripheral edge is now feathered.
Figure 6B:
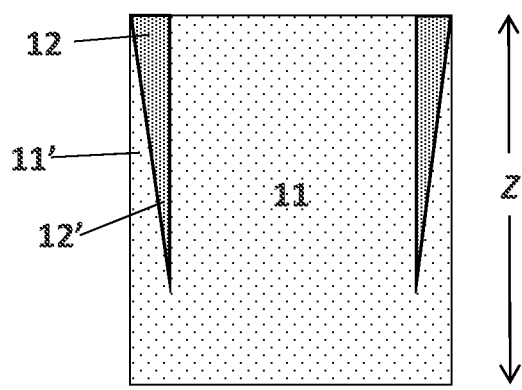
FIG. 6B is a side sectional view of an object similar to FIG. 6A, except that the feathered boundary portion is internal within the object, and the overexposed boundary portion extends only part way into the object.

FIGS. 6A-6B show side sectional views of an object produced in accordance with the invention, similar to what is shown in FIG. 2 above, except that the overexposed boundary portion now includes tapered or feathered portions 12' in the Z dimension.

An important aspect of some embodiments of the invention is not simply reducing distortion in an individual part, but in reducing dimensional variability in a batch of like parts. For example, when the parts are a batch of connectors, it is important that all (or at least most) members of that batch are mechanically compatible or interchangeable with one another.

Figure 7:
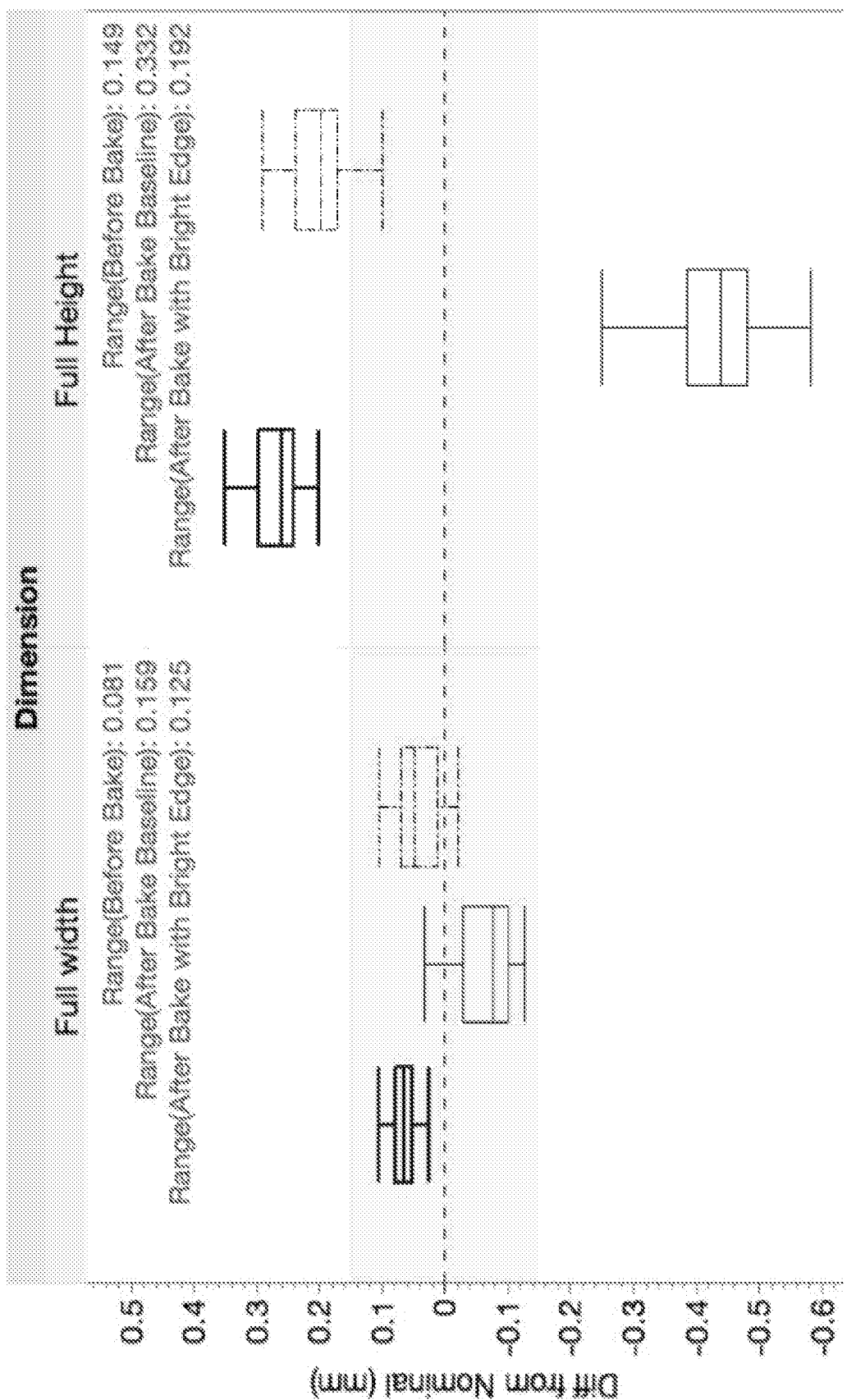
FIG. 7 provides dimensional variability of a group of like objects produced in accordance with the prior art, and in accordance with the present invention. Bold lines and bars represent dimension variability data for sample objects produced with standard exposure before bake; solid lines and bars represent dimension variability data for sample objects produced with standard exposure after bake; dashed lines and bars represent dimension variability data for sample objects produced with bright edge exposure after bake.

For example, a batch of objects were produced on a Carbon additive manufacturing apparatus (available from Carbon Inc., 1089 Mills Way, Redwood City, Calif. 94063) with a rigid polyurethane dual cure resin, washed, and then baked. Some of the objects were produced with a bright, or overexposed, peripheral edge portion as described above, and some were produced in accordance with conventional techniques. The data shown in FIG. 7 indicates decreased dimensional variability after the bake step for those objects produced with the overexposed edge portion, as compared to those which were not. In other experiments, diminishing benefits were seen with thicker objects, but the "bright edge" technique is seen as particularly advantageous for thinner objects or thin portions of objects having a more complex geometry.

The foregoing is illustrative of the present invention, and is not to be construed as limiting thereof. The invention is defined by the following claims, with equivalents of the claims to be included therein.

We claim:

1. A method of making a three-dimensional object from a light polymerizable dual cure resin, comprising the steps of:
   (a) producing a green intermediate object by light polymerization of said light polymerizable dual cure resin in a stereolithography process;
      (i) said intermediate object comprising a body portion and a circumferential boundary portion included in at least part of said body portion;
      (ii) said stereolithography process including overexposing said boundary portion, as compared to the exposure of said body portion, with light;
   (b) cleaning said intermediate object; and then
   (c) baking said intermediate object to produce said three-dimensional object,
   wherein said circumferential boundary portion is configured to reduce distortion of said three-dimensional object during said baking step,
   wherein said circumferential boundary portion is feathered in the Z dimension.

2. The method of claim 1, wherein said circumferential boundary portion is interrupted or perforated.

3. The method of claim 1, wherein said circumferential boundary portion is uninterrupted.

4. The method of claim 1, wherein said circumferential boundary portion comprises a surface edge portion.

5. The method of claim 1, wherein said circumferential boundary portion comprises an internal boundary portion.

6. The method of claim 1, wherein said circumferential boundary portion comprises a combination of at least one surface edge portion and at least one internal boundary portion.

7. The method of claim 1, wherein:
   (i) that portion of said intermediate object that includes said boundary portion has an average thickness of from 0.4 or 0.5 millimeters to 5 or 10 millimeters; and/or
   (ii) said boundary portion has an average thickness of from 10 or 50 micrometers to 100 or 200 micrometers.

8. The method of claim 1, wherein said cleaning step is carried out by wiping including blowing, washing, or a combination thereof.

9. A method of making a plurality of dimensionally uniform three-dimensional objects from a light polymerizable dual cure resin, the method comprising the steps of:
   (a) producing green intermediate objects by light polymerization of said light polymerizable dual cure resin in a stereolithography process;
      (i) each said intermediate object comprising a body portion and a circumferential boundary portion included in at least part of said body portion;
      (ii) said stereolithography process including overexposing said boundary portion, as compared to the exposure of said body portion, with light;
   (b) cleaning said intermediate objects; and then
   (c) baking said intermediate objects to produce said three-dimensional objects;
   said circumferential boundary portion configured to enhance dimensional uniformity of said three-dimensional objects by reducing distortion of each said three-dimensional object during said baking step,
   wherein said circumferential boundary portion is feathered in the Z dimension.

10. The method of claim 9, wherein said circumferential boundary portion is interrupted or perforated.

11. The method of claim 9, wherein said circumferential boundary portion is uninterrupted.

12. The method of claim 9, wherein said circumferential boundary portion comprises a surface edge portion.

13. The method of claim 9, wherein said circumferential boundary portion comprises an internal boundary portion.

14. The method of claim 9, wherein said circumferential boundary portion comprises a combination of at least one surface edge portion and at least one internal boundary portion.

15. The method of claim 9, wherein:
   (i) that portion of said object that includes said boundary portion has an average thickness of from 0.4 or 0.5 millimeters to 5 or 10 millimeters; and/or
   (ii) said boundary portion has an average thickness of from 10 or 50 micrometers to 100 or 200 micrometers.

16. The method of claim 9, wherein said cleaning step is carried out by wiping (including blowing), washing, or a combination thereof.

17. The method of claim 9, wherein said objects are produced simultaneously as a batch thereof on the same carrier platform.

\* \* \* \* \*